United States Patent [19]

Sutherland

[11] Patent Number: 5,584,127
[45] Date of Patent: Dec. 17, 1996

[54] SOLAR FRUIT DRYER

[75] Inventor: Trevor L. Sutherland, West Indies, Jamaica

[73] Assignee: Robert T. Johnson, Hartland, Wis.

[21] Appl. No.: 401,214

[22] Filed: Mar. 9, 1995

[51] Int. Cl.[6] ................................................. F26B 19/00
[52] U.S. Cl. .................. 34/93; 34/522; 34/196; 126/681
[58] Field of Search ................ 34/93, 522, 195, 34/196, 218, 219; 126/681, 629, 631

[56] References Cited

U.S. PATENT DOCUMENTS

| | | | |
|---|---|---|---|
| 2,529,621 | 11/1950 | Mayo | 34/93 |
| 2,920,398 | 1/1960 | Liljenstrom | 34/219 |
| 3,231,986 | 2/1966 | Touton | 34/93 |
| 3,386,838 | 6/1968 | Abalo . | |
| 4,006,260 | 2/1977 | Webb et al. . | |
| 4,045,880 | 9/1977 | Steffen | 34/93 |
| 4,069,593 | 1/1978 | Huang . | |
| 4,099,338 | 7/1978 | Mullin et al. . | |
| 4,127,947 | 12/1978 | Webb et al. . | |
| 4,263,721 | 4/1981 | Danford | 34/93 |
| 4,352,249 | 10/1982 | Rose . | |
| 4,499,911 | 2/1985 | Johnson . | |
| 4,565,552 | 1/1986 | Cotton . | |
| 4,718,249 | 1/1988 | Hanson . | |
| 4,800,653 | 1/1989 | Steffen . | |
| 4,924,762 | 5/1990 | Lane, Jr. . | |
| 5,185,261 | 2/1993 | Warrington . | |
| 5,260,088 | 11/1993 | Bernard . | |

FOREIGN PATENT DOCUMENTS

| | | | |
|---|---|---|---|
| 2701198 | 7/1978 | Germany | 126/681 |
| 3030889 | 2/1982 | Germany | 34/93 |
| 1815556 | 5/1993 | U.S.S.R. | 34/93 |

*Primary Examiner*—James Larson
*Attorney, Agent, or Firm*—Andrus, Sceales, Starke & Sawall

[57] ABSTRACT

A system for drying fruits, spices, vegetables and the like comprises a heating compartment having an inlet for introducing a flow of drying gas and heating arrangement for elevating the temperature of the drying gas. A drying compartment is connected to and in communication with the heating compartment for holding the material to be dried. A driving arrangement is disposed in the heating compartment for directing heated drying gas through the heating compartment and into drying relationship with the material to be dried in the drying compartment. An exhaust arrangement is provided in the drying compartment for withdrawing a portion of the spent drying gas and recirculating another portion of the spent drying gas back onto the drying compartment.

12 Claims, 2 Drawing Sheets

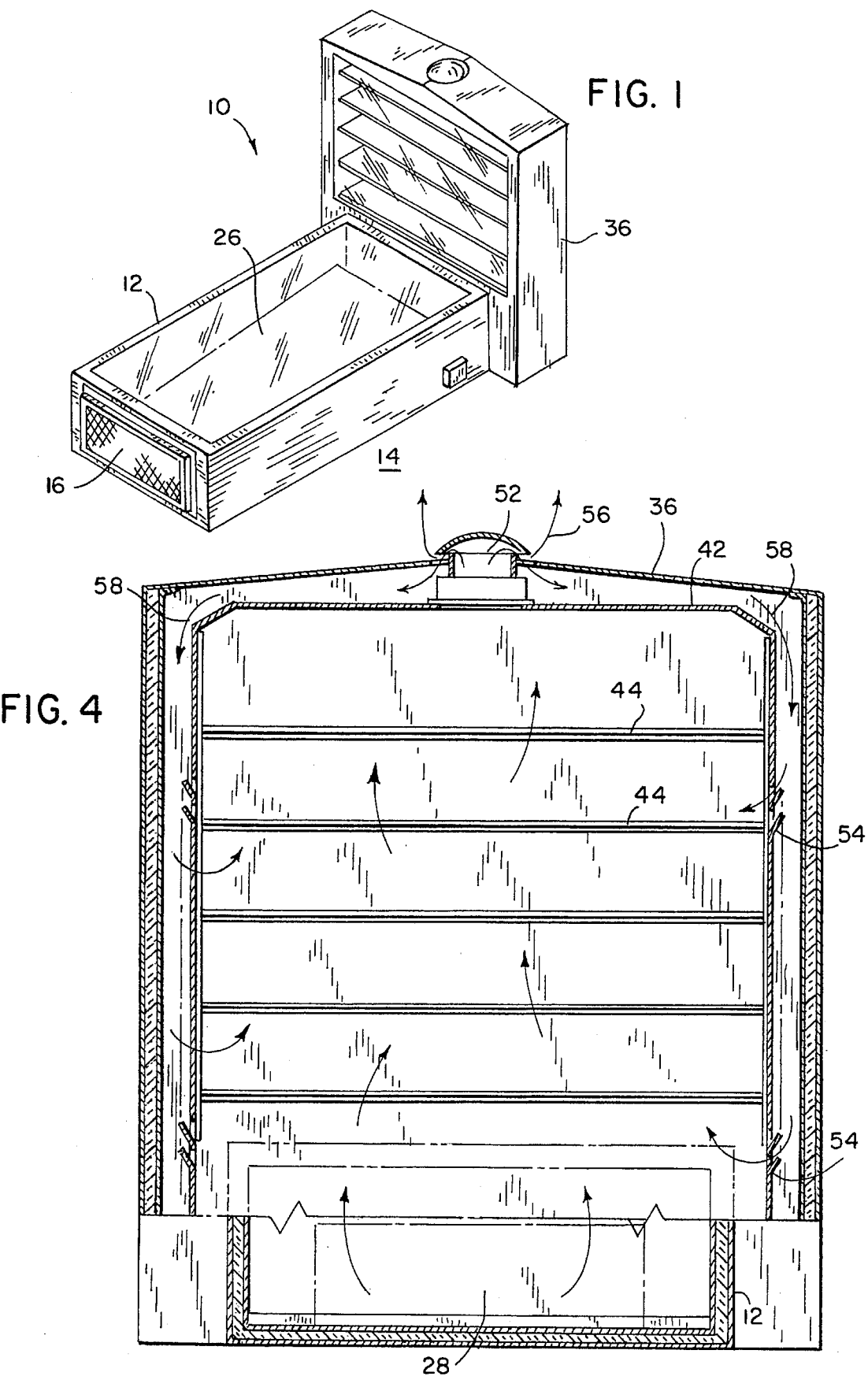

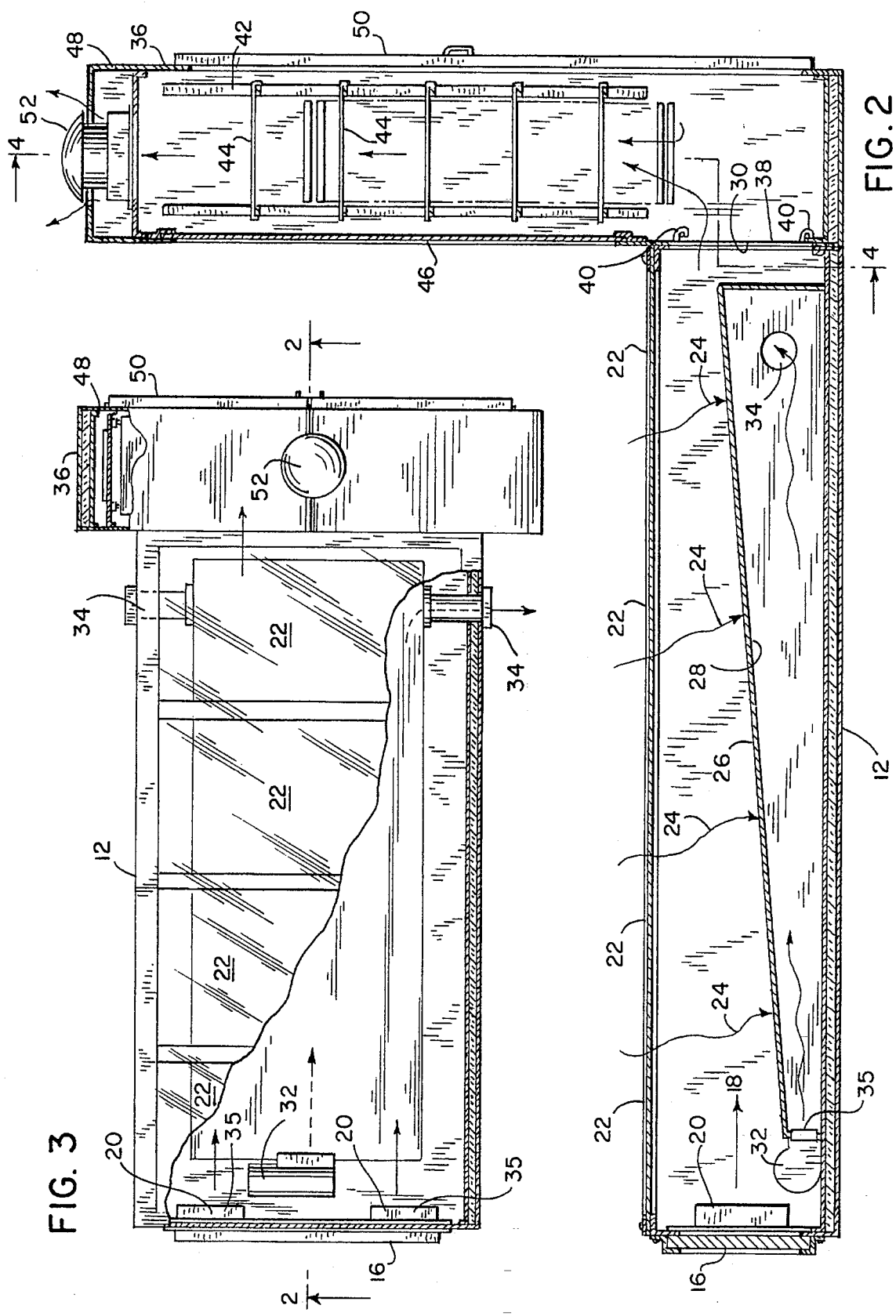

SOLAR FRUIT DRYER

TECHNICAL FIELD AND BACKGROUND OF THE INVENTION

The invention relates generally to forced air dryers and, more particularly, pertains to solar energy-based drying of fruits, vegetables, and other food particles.

The benefits of evaporating moisture or dehydrating foods such as bananas, raisins, dates, papayas, apples, tomatoes, onions and the like are well known. Weight is reduced, making transportation and storage less expensive; food may be preserved in varying temperature environments for long periods without refrigeration and continue to provide a concentrated, pleasing flavor.

The development of dehydrating procedures includes traditional methods wherein food particles are laid out in the sun on trays for several days during which period they were exposed to dust and were frequently discolored by the sun's ultraviolet rays. The moisture content is reduced by evaporation from the initial value of 80% to the range of 15%–25%. Despite the concentrations in sweetness that accrued as a result of direct sun drying, objections arose to the products as a result of their darkened color and the dust and dirt they accumulated. Some consumers also discovered the caramelized quality of fruit sugars that are generated to a small extent in some products to be objectionable, and this caramelization was proven to be due to prolonged overheating in the sun.

Next, enclosed kilns were developed which blow heated dry air at about 65° F. over and between the food particles laid out on a perforated kiln floor. Further drying compensation had to be considered when the food particles were dipped in chemical preservatives which increased their moisture content.

Another type of drying system is a continuous through circulation dryer having a natural gas burner which discharges its hot combustion into a mixture of recycled vapors from a drying bed and makeup air from the outside; the resulting hot gas and vapor mixture is drawn with a fan from a gas mixing plenum and blown into drying contact through a gas permeable bed of goods to be dried. The gas is withdrawn from drying contact and most of it is recycled for reheating while a portion is expended to the atmosphere as spent gas.

Notwithstanding these previous designs, it remains desirable to provide an improved drying system of a modified type from that known in the prior art which is effective to maintain a constant temperature range in a drying compartment to ensure even drying of food particles disposed therein. It is further desirable to provide a drying system which is solar energy-based yet contemplates the assistance of a backup fuel source for continuous 24 hour production. It is also desirable to provide a solar-based drying system which employs a collector device which permits maximum dehydrating heat flow to the food material to be dried.

SUMMARY OF THE INVENTION

The improved drying system for evaporating moisture from food particles advantageously provides solar heating at a very low capital cost. The system presents a solar based drying structure which may be used alone or in conjunction with an auxiliary heat source. The system employs a collector arrangement which maximizes heat flow to the food material to be dried and which simultaneously defines a heating chamber for enclosing hot gases of combustion.

These and other aspects of the invention are realized in a drying system comprising a heating compartment having an inlet for introducing a flow of drying gas, a heating means located in the heating compartment for elevating the temperature of the drying gas, a drying compartment connected to and in communication with the heating compartment for holding material to be dried, a driving means disposed in the heating compartment for directing heated drying gas into the drying compartment and into drying relationship with the material to be dried in the drying compartment and exhaust means in the drying compartment for withdrawing a portion of the spent drying gas from and recirculating another portion of the spent drying gas into the drying compartment.

In yet another aspect of the invention, a method of drying material comprises the steps of introducing a flow of drying gas into a heating compartment, elevating the temperature of the drying gas in the heating compartment, providing a drying compartment in communication with the heating compartment for holding material to be dried, directing the heated drying gas through the heating compartment and into drying relationship with the material to be dried in the drying compartment, and withdrawing a portion of the spent drying gas from and recirculating another portion of the spent drying gas into the drying compartment.

The invention also contemplates a drying system comprising a drying compartment for holding material to be dried, and a heating compartment connected to and in communication with the drying compartment, the heating compartment including an inlet for introducing a flow of drying gas, an area of transparent material for transmitting solar radiation and the energy associated therewith into the system, a collector means for absorbing solar energy transmitted through the transparent material, and an outlet for allowing exit of the drying gas. The collector means forms a heating chamber having a volume progressively increasing from the inlet to the outlet. Heating means are disposed in the heating compartment for transferring heat energy to the collector means. Driving means are disposed in the heating compartment for directing the drying gas over the collector means and into drying relationship with the material to be dried in the drying compartment whereby the heat energy supplied by the heating means is selectively combined with the collected solar energy from the collector means. Exhaust means are included in the drying means for withdrawing a portion of the spent drying gas from and recirculating another portion of the spent drying gas into the drying compartment.

BRIEF DESCRIPTION OF THE DRAWINGS

The invention will become better understood by reference to the following detailed description of the preferred exemplary embodiment when read in conjunction with the appended drawing, wherein like numerals denote like elements and:

FIG. 1 is a perspective view of a drying system embodying the present invention;

FIG. 2 is a cross-sectional view taken on line 2—2 of FIG. 3.

FIG. 3 is a top view of the drying system with parts broken away to illustrate various details; and FIG. 4 is a cross-sectional view taken on line 4—4 of FIG. 2.

DETAILED DESCRIPTION OF THE PREFERRED EMBODIMENTS

With reference to FIGS. 1–4, the drying system of the present invention is shown therein and indicated generally by the numeral 10. Although the drying system 10 is preferably used to dry vegetables, fruit, spices, and other food products, it should be understood that the system 10 of the present invention may be adapted to dry many other types of material within a certain stage or phase of processing.

Viewing the same drying system 10 in greater detail, it can be seen that a generally rectangular, horizontally disposed heating compartment 12 extends along a substantially flat surface 14. Heating compartment 12 is provided at its forward end thereof with an inlet 16 for introducing a flow of drying gas or air as represented by arrow 18 in FIG. 2. Located on the inside of heating compartment 12 opposite inlet 16 is a pair of equilaterally spaced variable speed blower fans 20 for directing the flow of drying gas throughout heating compartment 12. Each fan 20 includes an air filter for removing airborne particulate matter from the intake air, in a manner as is known.

The top surface of heating compartment 12 accommodates a series of transparent removable glass panels 22 through which solar rays 24 are transmitted for a purpose to be understood shortly hereafter. Disposed interiorly of heating compartment 12 is a collector plate 26 extending substantially the length of heating compartment 12. The upper portion of collector plate 26 rises upwardly in an inclined fashion as it extends along the length of heating compartment 12 and forms therebeneath a heating chamber 28 having a volume progressively increasing from adjacent inlet 16 towards an open outlet 30 at the rear end of heating compartment 12. To maximize the solar collecting efficiency of heating compartment 12, the outer surface of collector plate 26 is thermally black or painted black. At the entrance end of heating chamber 28, there is provided a heating means 32 in the form of an LP or barbecue gas burner whose heat and gases of combustion travel through heating chamber 28 and are vented through exhaust pipes 34 communicating the interior of heating chamber 28 with the air outside of heating compartment 12.

A moisture-removing filter bed, shown at 35, is mounted to the outlet of burner 32 to dry the air heated by burner 32. Similarly, filter beds may be mounted to the discharge of fans 20 in order to dry the air circulated through heating compartment 12. The filter beds may be of the silica gel type, or may use any other satisfactory moisture-removing medium. The filters preferably are installed so as to provide easy removal of a spent bed and replacement with a regenerated bed.

The other major component of drying system 10 is a generally rectangular, vertically disposed drying compartment 36 having an opening at the bottom of its forward wall 38, which is removably attachable to end wall of heating compartment 12, in which outlet 30 is formed. The interior of drying compartment communicates through outlet 30 and the opening in forward wall 38 with the interior of heating compartment 12.

Suitable hook-type latches 40 or other alternative hookups are installed on both compartments 12, 36 which enables the drying system 10 to be broken down and transported if desired. Although not shown, it should also be understood that casters or wheels may be provided on the bottom of heating compartment 12 as well as drying compartment 36 to enable further portability.

Drying compartment 36 includes a drying chamber 42 which is provided with a series of removable, perforated horizontal shelves 44 for holding the material to be dried. The upper portion of forward wall 38 receives a glass panel 46 for observing the drying of material on shelves 44. The rear wall 48 of drying compartment is defined by a hinged double door arrangement 50 which permits full access to loading and unloading removable shelves 44. At the top of drying compartment 36 is an exhaust fan 52 (best seen in FIG. 4) which is capable of both withdrawing portions of spent drying gas from drying compartment 36 and recirculating portions of spent drying gas into drying chamber 42 by means of vents 54 formed therein.

Before proceeding with an explanation of the operation, it should be emphasized that the present invention provides a drying arrangement principally designed to efficiently and economically gather and implement solar energy in a drying process. With the provision of heating means 32, there is provided a system in which the operator may selectively attain the desired dehydration of food particles or the like by utilizing solar energy alone, such as on a sunny day, or solar energy in combination with heat energy, such as on a partly sunny day, or heat energy alone, such as on a cloudy day or during darkness.

With the availability of sunlight, outside air is continuously drawn through inlet 16 and blown rearwardly by fans 20 over collector plate 26 towards outlet 30. As the air flows through heating compartment 12, a substantial amount of solar energy in the form of heat is transferred to the passing air from plate 26 and ultimately introduced into the drying compartment 36. The hot air flows through perforated shelves 44 and into contact with the food articles or the like supported by shelves 44, to accomplish the desired dehydration of such articles on shelves 44. After the heated drying air is exposed to the food to be dried, a portion represented by arrows 56 is vented to the atmosphere while another portion represented by arrows 58 is recirculated back into drying chamber 42 in vents 54. Again, moisture-removing filters are preferably mounted within vents 54 to remove moisture from the recirculated drying air before such air is used in a subsequent drying operation. If sunlight is not at the desired level, heating means 32 is utilized alone or in conjunction with solar energy collected to provide the heat energy necessary to maintain a generally constant temperature of 125°–135° F. in drying chamber 42.

The filter beds, such as 35, associated with fans 20 ensure that air circulated through heating chamber 28 and drying chamber 36 is dry, so as to ensure that the product supported on racks 44 is dried, and not cooked.

It should be appreciated that the inclined configuration of collector plate 26 contributes to maximize heat flow from heating compartment 12 into drying compartment 36 as air flows over plate 26. It should also be understood that collector plate 26 defines heating chamber 28 by which optional or supplementary heat energy can be used to heat the continuous flow of drying air passing from heating compartment 12 to drying compartment 36.

A typical drying system 10 constructed in accordance with the present invention has a heating compartment 12 72 inches long, 48 inches wide, and 24 inches high. Heating compartment 12 is preferably comprised of 22 gauge aluminum with heat insulation used where desirable. Blower fans 20 are typically 15 inches by 12.5 inches and have a blowing capacity of 3000 CFM each. Each of the glass panels 22 is 24 inches wide by 48 inches long and has a thickness of 0.25 inches. Collector plate 26 is preferably comprised of 16 gauge steel 36 inches wide by 60 inches long, commences at a height of 2 inches above the bottom of heat compartment 12 and terminates at a height of 10 inches above the bottom of heating compartment 12. Exhaust pipes 34 are typically 2 inches in diameter. Drying compartment 36 is preferably comprised of 22 gauge aluminum and is typically 84 inches wide by 84 inches long. Exhaust fan 52 is typically 30 inches in diameter and has a capacity of 12,000 CFM, while recirculating vents 54 are desirably 3 inches in length. In order to enhance loading and unloading of food from drying system 10, provision can be made to adapt a loading ramp (not shown) to the bottom rear of drying compartment 36 at the base of hinged double doors 50.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A drying system comprising:

a heating compartment having an inlet for introducing a flow of drying gas;

heating means located in said heating compartment for elevating the temperature of said drying gas;

a drying compartment connected to and in communication with said heating compartment for holding material to be dried;

wherein said heating compartment and said drying compartment are removably attached to each other;

driving means disposed in said heating compartment for directing said heated drying gas through said heating compartment into said drying compartment and into drying relationship with the material to be dried in said drying compartment; and exhaust means in said drying compartment for withdrawing a portion of spent drying gas from and recirculating another portion of spent drying gas into said drying compartment.

2. The drying system of claim 1, wherein said drying compartment includes a hinged door arrangement for accessing the interior thereof.

3. A drying system comprising:

a heating compartment having an inlet for introducing a flow of drying gas;

heating means located in said heating compartment for elevating the temperature of said drying gas;

a drying compartment connected to and in communication with said heating compartment for holding material to be dried, wherein said drying compartment is provided with a series of recirculating vents;

driving means disposed in said heating compartment for directing said heated drying gas through said heating compartment into said drying compartment and into drying relationship with the material to be dried in said drying compartment; and exhaust means in said drying compartment for withdrawing a portion of spent drying gas from and recirculating another portion of spent drying gas into said drying compartment.

4. A drying system comprising:

a heating compartment having an inlet for introducing a flow of drying gas;

heating means located in said heating compartment for elevating the temperature of said drying gas, including a collector means cooperable with said heating means to transfer heat energy to said drying gas, wherein said collector means defines a narrowing passageway in said heating compartment through which said drying gas flows;

a drying compartment connected to and in communication with said heating compartment for holding material to be dried;

driving means disposed in said heating compartment for directing said heated drying gas through said heating compartment into said drying compartment and into drying relationship with the material to be dried in said drying compartment; and exhaust means in said drying compartment for withdrawing a portion of spent drying gas from and recirculating another portion of spent drying gas into said drying compartment.

5. A drying system comprising:

a drying compartment for holding material to be dried;

a heating compartment connected to and in communication with said drying compartment;

said heating compartment including an inlet for introducing a flow of drying gas, an area of transparent material for transmitting solar radiation and the energy associated therewith into said system, a collector means for absorbing solar energy transmitted through said transparent material and an outlet for allowing exit of said drying gas;

said collector means forming a heating chamber having a volume progressively increasing in a direction from said inlet to said outlet;

heating means in said heating compartment for transferring heat energy to said collector means;

driving means disposed in said heating compartment for directing said drying gas over said collector means and into drying relationship with said material to be dried in said drying compartment whereby the heat energy supplied by said heating means is selectively combined with the collected solar energy from said collector means; and exhaust means in said drying compartment for withdrawing a portion of spent drying gas from and recirculating another portion of spent drying gas into said drying compartment.

6. The drying system of claim 5, wherein said heating chamber is provided with exhaust means enabling gas contained within said heating chamber to exit from said heating chamber into the atmosphere.

7. The drying system of claim 5, wherein said collector means further defines an inclined surface extending from said inlet to said outlet over which said drying gas is directed.

8. The drying system of claim 5, wherein said heating compartment has a top surface defined by said transparent material, said transparent material comprising a series of removable glass panels.

9. The drying system of claim 5, wherein said drying compartment has a front wall provided with an observation window for monitoring the drying of material therein.

10. The drying system of claim 5, wherein said drying compartment is disposed substantially orthogonal to said heating compartment.

11. A drying system comprising:

a heating compartment having an inlet for introducing a flow of drying air, an outlet for allowing exit of said drying air, and a flow path extending between said inlet and said outlet; a transparent top surface for transmitting solar radiation and the energy associated therewith a plate for collecting the solar energy from said top surface; and a supplementary heating source isolated from said flow path for heating said plate independent of solar energy;

a drying compartment for holding material to be dried having an inlet in communication with said outlet of said heating compartment, and an exhaust outlet for withdrawing drying air from said drying compartment; and driving means for moving said drying air through said heating compartment into said drying compartment and into drying relationship with the material to be dried.

12. The drying system of claim 11, wherein said supplementary heating source comprises an auxiliary heating chamber associated with said heating compartment and defined at least in part by said plate.

* * * * *